(12) United States Patent
Kono

(10) Patent No.: US 9,031,377 B2
(45) Date of Patent: May 12, 2015

(54) PLAYBACK DEVICE, PLAYBACK METHOD, AND COMPUTER PROGRAM

(75) Inventor: Kazuhiko Kono, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 70 days.

(21) Appl. No.: 14/007,216

(22) PCT Filed: Mar. 27, 2012

(86) PCT No.: PCT/JP2012/002127
§ 371 (c)(1),
(2), (4) Date: Sep. 24, 2013

(87) PCT Pub. No.: WO2012/132417
PCT Pub. Date: Oct. 4, 2012

(65) Prior Publication Data
US 2014/0016907 A1    Jan. 16, 2014

(30) Foreign Application Priority Data

Mar. 28, 2011 (JP) .................. 2011-069224

(51) Int. Cl.
*H04N 5/775* (2006.01)
*H04N 9/77* (2006.01)
(Continued)

(52) U.S. Cl.
CPC ........... *H04N 13/0022* (2013.01); *H04N 5/213* (2013.01); *H04N 9/8227* (2013.01);
(Continued)

(58) Field of Classification Search
CPC .......... H04N 13/0007; H04N 13/0018; H04N 13/0022; H04N 13/0048; H04N 13/0452; H04N 5/213; H04N 9/8227
USPC ........ 386/230; 348/663, 665, E9.035, E9.036
See application file for complete search history.

(56) References Cited

U.S. PATENT DOCUMENTS 6,005,607 A    12/1999 Uomori et al.
2004/0062434 A1    4/2004 Tsuyuki et al.
(Continued)

FOREIGN PATENT DOCUMENTS

JP    07-336729 A    12/1995
JP    09-074573 A    3/1997
(Continued)

OTHER PUBLICATIONS

Japanese Office Action for Japanese Application No. 2013-507182 dated Jun. 25, 2013.
(Continued)

*Primary Examiner* — Thai Tran
*Assistant Examiner* — Syed Hasan
(74) *Attorney, Agent, or Firm* — Renner, Otto, Boisselle & Sklar, LLP

(57) ABSTRACT

When reproducing a binocular 3D video, noises with random parallax are reduced by appropriately controlling the intensity of noise reduction.

A reproduction apparatus includes: a noise processing circuit for applying noise processing to a video signal of a video content based on a given control signal; and a control section for receiving an output format identification signal which identifies an output format of the video content, and generating the control signal in accordance with the output format identification signal, the control section generating a control signal which causes the noise processing performed in the noise processing circuit to vary depending on whether an output format of the video content is a two-dimensional video or a three-dimensional video.

11 Claims, 9 Drawing Sheets

(51) Int. Cl.
*H04N 9/78* (2006.01)
*H04N 13/00* (2006.01)
*H04N 5/213* (2006.01)
*H04N 9/82* (2006.01)
*H04N 13/04* (2006.01)

(52) U.S. Cl.
CPC ....... *H04N13/0007* (2013.01); *H04N 13/0048* (2013.01); *H04N 13/0018* (2013.01); *H04N 13/0452* (2013.01); *H04N 2213/007* (2013.01)

(56) References Cited

U.S. PATENT DOCUMENTS

| | | | |
|---|---|---|---|
| 2009/0033799 A1* | 2/2009 | Kim | 348/665 |
| 2010/0079483 A1 | 4/2010 | Naganuma et al. | |
| 2011/0175980 A1 | 7/2011 | Yanagisawa | |

FOREIGN PATENT DOCUMENTS

| | | |
|---|---|---|
| JP | 2004-118711 A | 4/2004 |
| JP | 2005-175566 A | 6/2005 |
| JP | 2009-194550 | 8/2009 |
| JP | 2010-245844 A | 10/2010 |
| JP | 2011-009857 | 1/2011 |
| WO | WO 2010/035492 A1 | 4/2010 |
| WO | WO 2010/050084 A1 | 5/2010 |

OTHER PUBLICATIONS

International Search Report for corresponding International Application No. PCT/JP2012/002127 mailed May 1, 2012.

Form PCT/ISA/237 for corresponding International Application No. PCT/JP2012/002127 mailed May 1, 2012 and partial English translation.

* cited by examiner

FIG.6

|  | MATERIAL | OUTPUT | NR INTENSITY |
|---|---|---|---|
| CONDITION A | 2D | 2D | STANDARD |
| CONDITION B | 2D | 3D | STRONG 2 |
| CONDITION C | 3D | 2D | STANDARD |
| CONDITION D | 3D | 3D | STRONG 1 |

※ STANDARD＜STRONG 2＜STRONG 1

PLAYBACK DEVICE, PLAYBACK METHOD, AND COMPUTER PROGRAM

TECHNICAL FIELD

The present invention relates to a technique of reproducing a video content as a three-dimensional (3D) video, with a video for the left eye (L) and a video for the right eye (R).

BACKGROUND ART

Techniques of obtaining a stereoscopic effect by presenting parallaxed videos to the right and left eyes have long been known. Such techniques are called the binocular 3D method. As one example of the binocular 3D method, a technique described in Patent Document 1 is known, for example. 3D video reproduction apparatuses utilizing this principle have already been put to practical use.

CITATION LIST

Patent Literature

[Patent Document 1] Japanese Laid-Open Patent Publication No. 07-336729

SUMMARY OF INVENTION

Technical Problem

A video which has actually been taken with a camera, a film, or the like is sure to contain random noises. In the case of camera shooting, a random noise called camera noise is superposed on the video, this noise being associated with the signal-to-noise ratio (S/N) of the image sensor such as a CCD or a CMOS. On the other hand, in the case of a silver salt film, a random noise called film (grain) noise is superposed on the video, this noise being associated with silver salt pigment particles.

Such random noises are of course annoying to a viewer who is viewing a binocular 3D video.

An objective of the present invention relates to a technique which, while conforming to the characteristics of a binocular 3D video, reduces random noise from a binocular 3D video.

Solution to Problem

A reproduction apparatus according to an embodiment of the present invention comprises: a noise processing circuit for applying noise processing to a video signal of a video content based on a given control signal; and a control section for receiving an output format identification signal which identifies an output format of the video content, and generating the control signal in accordance with the output format identification signal, the control section generating a control signal which causes the noise processing performed in the noise processing circuit to vary depending on whether an output format of the video content is a two-dimensional video or a three-dimensional video.

In one embodiment, the noise processing circuit includes at least one noise reduction circuit for applying a noise reduction process to the video signal based on the control signal; and the noise reduction process applied to the video content by the at least one noise reduction circuit based on the control signal when the output format of the video content is a three-dimensional video is more intense than the noise reduction process applied to the video content when the output format of the video content is a two-dimensional video.

In one embodiment, the control section further receives a video material identification signal indicating whether the video content has been produced to be a three-dimensional video or produced to be a two-dimensional video; and when the output format of the video content is a three-dimensional video, the noise reduction process applied to the video content which has been produced to be a three-dimensional video is more intense than the noise reduction process applied to the video content which has been produced to be a two-dimensional video.

In one embodiment, the at least one noise reduction circuit generates a noise detection signal representing a noise component by calculating a difference between the video signal before being subjected to the noise reduction process and the video signal after being subjected to the noise reduction process, and performs the noise reduction process by subtracting a signal obtained by multiplying the noise detection signal by a coefficient which is determined in accordance with the control signal from the video signal before being subjected to the noise reduction process.

In one embodiment, when the output format of the video content is a three-dimensional video, the at least one noise reduction circuit performs a more intense noise reduction process by setting as the coefficient a value which is greater than that when the output format of the video content is a two-dimensional video.

In one embodiment, the reproduction apparatus further comprises a decoder for decoding a video signal of a three-dimensional video into a video signal of a left-eye video and a video signal of a right-eye video, wherein the noise processing circuit includes two noise reduction circuits for, based on the control signal, applying a noise reduction process to the respective video signals of the left-eye video and the right-eye video.

In one embodiment, the reproduction apparatus further comprises a multiplexing section for multiplexing for output the respective video signals of the left-eye video and the right-eye video having been subjected to the noise reduction processes by the two noise reduction circuits.

In one embodiment, the multiplexing section receives the output format identification signal from an external device, and outputs the output format identification signal to the control section.

In one embodiment, the reproduction apparatus further comprises a detection section for, when the video content is composed of the left-eye video and the right-eye video, detecting parallax information concerning a parallax between the left-eye video and the right-eye video, wherein the noise processing circuit includes at least one noise addition circuit for, based on the parallax information, adding noise to the video signal.

In one embodiment, the at least one noise addition circuit adds more noise to the video signal as the parallax becomes smaller.

In one embodiment, the parallax information contains information indicating which position in a rearward direction or a protruding direction a subject contained in the video content is located at; and the at least one noise addition circuit adds the noise so as to be displayed at a position in the rearward direction or protruding direction corresponding to the parallax information.

A reproduction method according to another embodiment of the present invention comprises the steps of: receiving an output format identification signal which identifies an output format of a video content; determining whether the output format of the video content is a two-dimensional video or a three-dimensional video in accordance with the output format identification signal; and applying noise processing to a video signal of the video content based on a result of determination, such that the noise processing is varied depending on whether the output format of the video content is a two-dimensional video or a three-dimensional video.

A computer program according to still another embodiment of the present invention is a computer program to be executed by a computer mounted in a reproduction apparatus, wherein the computer program causes the computer in the reproduction apparatus to execute the steps of: receiving an output format identification signal which identifies an output format of a video content; determining whether the output format of the video content is a two-dimensional video or a three-dimensional video in accordance with the output format identification signal; and applying noise processing to a video signal of the video content based on a result of determination, such that the noise processing is varied depending on whether the output format of the video content is a two-dimensional video or a three-dimensional video.

Advantageous Effects of Invention

According to an embodiment of the present invention, when reproducing a binocular 3D video, the noise processing which is performed in the noise processing circuit is varied depending on whether the output format of the video content is a two-dimensional video or a three-dimensional video. By appropriately controlling the noise reduction intensity, noises with random parallax can be reduced.

According to another embodiment of the present invention, after reducing noises with random parallax, noise is added to the video signal based on parallax information. As a result, film-derived texture can be left while noises with random parallax are reduced.

BRIEF DESCRIPTION OF DRAWINGS

FIG. 6 is a diagram showing setup conditions for intensity (NR intensity) of a noise reduction process by the reproduction apparatus 12.

DESCRIPTION OF EMBODIMENTS

Figure 1:
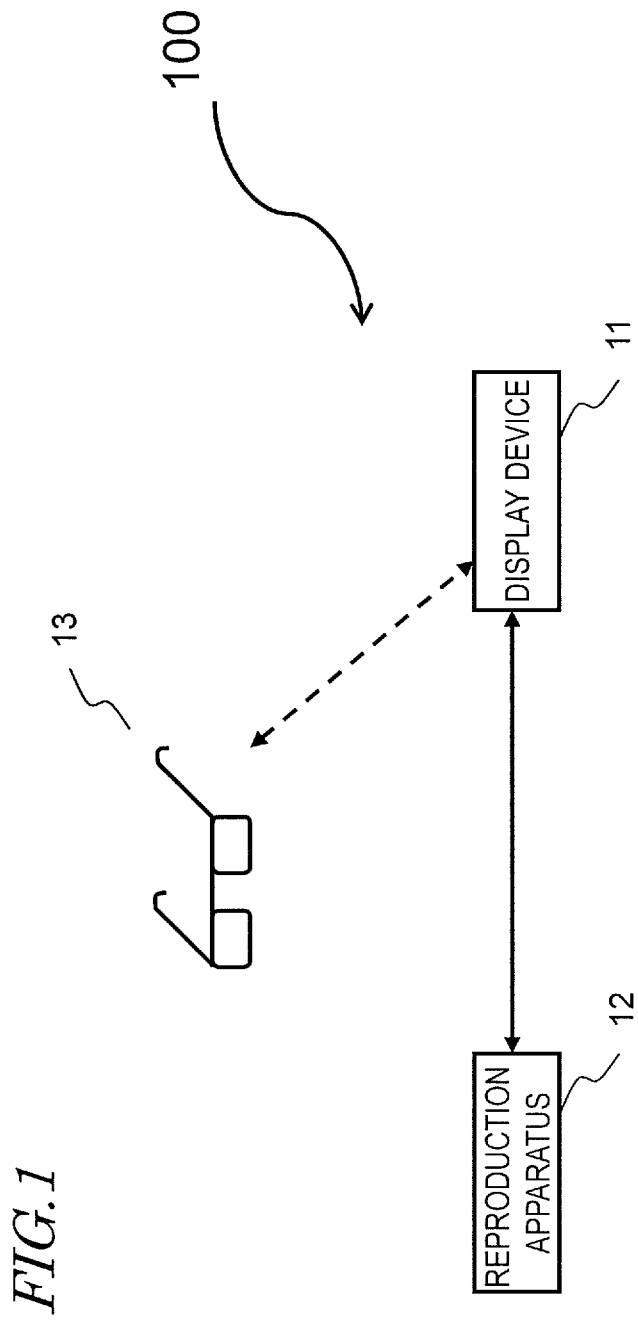
FIG. 1 is an overall configuration diagram of a 3D video reproduction system 100.

Prior to describing Embodiments as examples of the present invention, findings made by the inventor will be described.

Among conventional video reproduction apparatuses, some are known to perform a noise reduction process for removing random noise when reproducing a video which does not involve any parallax (so-called two-dimensional (2D) video). Therefore, when reproducing a binocular 3D video having a parallax, a noise reduction process might be conducted alike for each of the left-eye video and right-eye video composing the 3D video (in the present specification, a video for the left eye that is utilized for 3D displaying will be referred to as the "L video", and a video for the right eye as the "R video").

However, the inventor have found that random noise may not be adequately removed even if the same noise reduction as that for 2D video reproduction is applied to the L video and the R video. In studying the reasons thereof, the inventor paid attention to the nature of random noise that exist in the R video and the L video.

In a binocular 3D video, random noise occurs independently in the respective cameras or respective films for imaging the L video and the R video. Therefore, there is no correlation between the random noises of the L video and the R video. The respective random noises of the L video and the R video as such may be perceived by the viewer with a parallax. For example, if a noise occurs at a given position in the L video, and a similar noise occurs near the position in the R video corresponding to that position, the noise in the L video and the noise in the R video have a parallax, such that they are perceived as a stereoscopic noise by the viewer. Considering the fact that random noise is contained in the L video and the R video, it may be said that noises with random parallax are mixed in the L video and the R video. Hereinafter, random noise with such parallax will conveniently referred to as "random-parallax noise". Random-parallax noise exists irrespective of the parallax of the 3D video that defines the content for viewing.

The inventor took note of the fact that random-parallax noise presents a significant oddness to the viewer and hinders 3D stereoscopy, thus lowering the quality of the 3D content which is intended for viewing. The reason is that random-parallax noise may be perceived by the viewer as if pieces of soil that are stuck at certain rearward positions within the 3D video.

For example, consider a 3D video to which a parallax has been imparted so that, against the background of a certain landscape, a subject is positioned frontward of that landscape. A random noise that is contained in the landscape portion of this 3D video may coincidentally be perceived as a random-parallax noise that exists at the same position as the subject. Moreover, if a random-parallax noise occurs in a region which straddles the landscape and the subject, a discontinuity will be felt in the stereoscopic presentation, such that the viewer will be clearly aware that some sort of noise is present.

The inventor have realized that, when reproducing a binocular 3D video, it is not sufficient to apply the same noise reduction process as that for a 2D video. The reason is that, with the same noise reduction process as that for a 2D video, the random-parallax noise would only be slightly reduced and thus the random-parallax noise would still be perceived relatively clearly. Accordingly, the inventor have accomplished a reproduction apparatus as described below.

The reproduction apparatus includes: a noise processing circuit which applies noise processing to a video signal of a video content, based on a given control signal; and a control section. The control section receives an output format identification signal which identifies an output format of the video content, and generates a control signal in accordance with the output format identification signal. Then, the control section generates a control signal which causes the noise processing performed at the noise processing circuit to vary depending on whether the output format of the video content is 2D video or 3D video. As a result, depending on whether the output format of the video content is 3D video or 2D video, different processes will be applied to the noise. Since no same process is performed when outputting a 3D video and when outputting a 2D video, it is possible to perform noise processing which is adapted to each video.

For example, a case will be considered where the "noise processing" is a noise reduction process. When the output format of the video content is 3D video, the noise reduction process for the video content may be intensified relative to the noise reduction process for the video content that is to be conducted when the output format of the video content is two-dimensional video. By applying a more intense noise reduction process to the 3D video than the noise reduction process that is applied to the 2D video, it becomes possible to greatly reduce random-parallax noise and alleviate oddness.

Hereinafter, with reference to the attached drawings, embodiments of the reproduction apparatus according to the present invention will be described.

(Embodiment 1)

Figure 2:
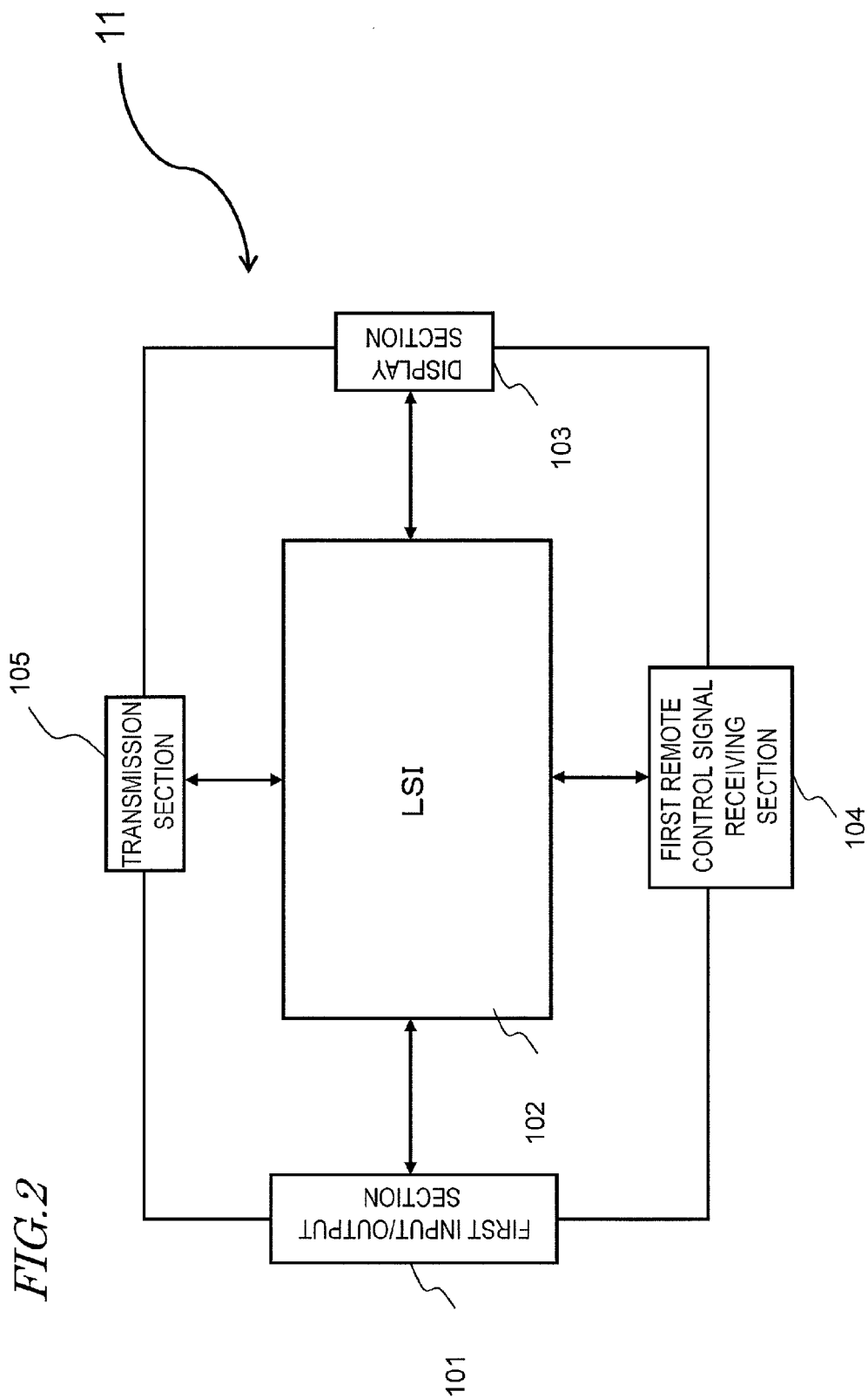
FIG. 2 is a configuration diagram of a display device 11.
Figure 3:
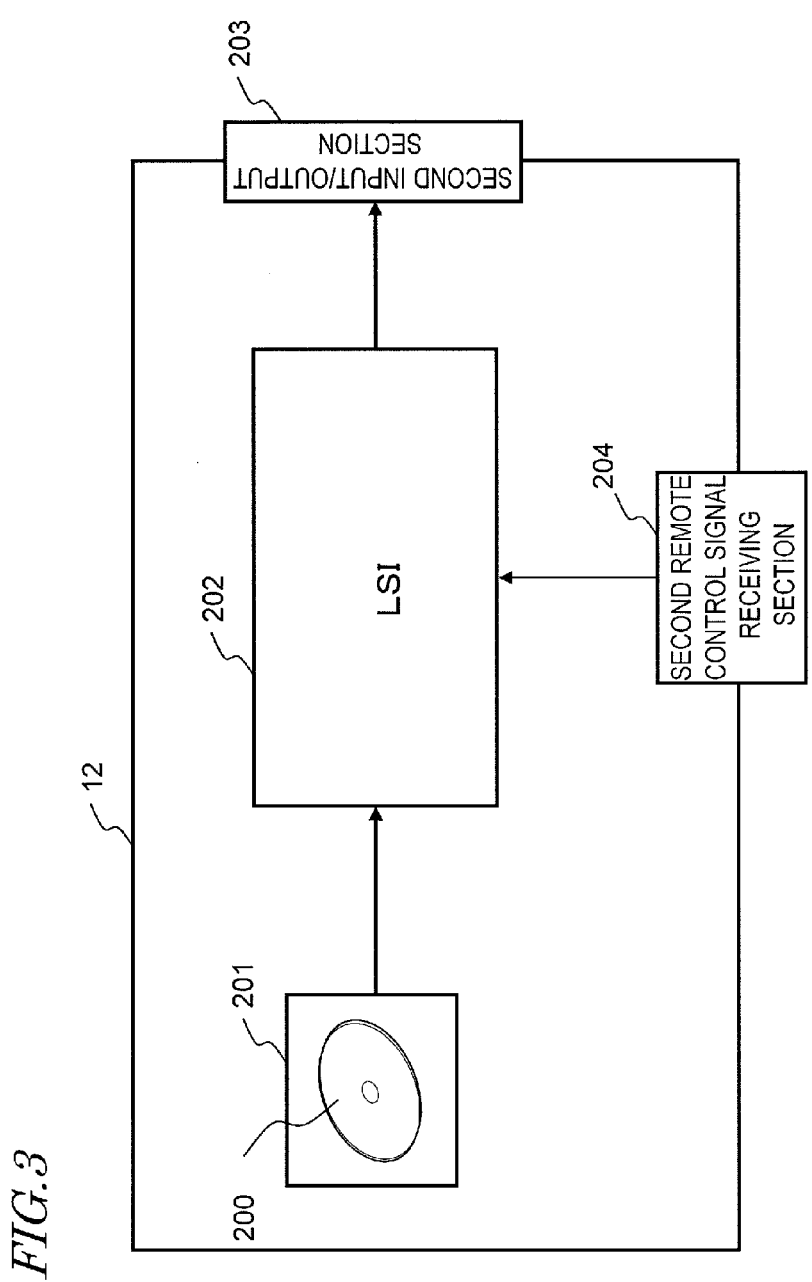
FIG. 3 is a diagram showing the configuration of a reproduction apparatus 12.

1. Configuration (FIGS. 1, 2, 3)

Hereinafter, with reference to FIGS. 1, 2, and 3, an illustrative reproduction system and reproduction apparatus according to a first embodiment will be described.

FIG. 1 is an overall configuration diagram of a 3D video reproduction system 100 according to the present embodiment. The 3D reproduction system 100 includes a display device 11, a reproduction apparatus 12, and stereoscopic glasses 13.

The display device 11 displays a 3D video by alternately switching between an L video and an R video via time division, for example. Specific examples of the display device 11 include a plasma display, a liquid crystal display, and an organic EL display.

The reproduction apparatus 12 reads out a video material from a broadcast wave, a storage medium, a network (none of which is shown) or the like, and reproduces an L video and an R video. The reproduction apparatus 12 may be a Bluray disc player, for example. The stereoscopic glasses 13 are polarized glasses having liquid crystal shutters that separate a 3D video which is displayed by the display device 11 into the L video and the R video, for example.

FIG. 2 is a configuration diagram of the display device 11 according to the present embodiment.

The display device 11 includes a first input/output section 101, an LSI 102, a display section 103, a first remote control signal receiving section 104, and a transmission section 105.

The first input/output section 101 receives an output from the reproduction apparatus 12 of FIG. 1. The first input/output section 101 is an HDMI terminal and a controller, for example.

Receiving an output from the first input/output section 101, the LSI 102 processes video and audio signals to generate a signal with which to drive the display section 103. In the present embodiment, the LSI 102 is a semiconductor integrated circuit.

Upon receiving an output from the LSI 102, the display section 103 displays a 3D video. The first remote control signal receiving section 104 accepts a signal from a remote control which is manipulated by the user. In accordance with the output from the LSI 102, the transmission section 105 transmits a synchronization signal to the stereoscopic glasses 13 in FIG. 1. The synchronization signal is used for the stereoscopic glasses 13 to switch between displaying the L video and displaying the R video. The transmission section 105 transmits the synchronization signal by, generally speaking, using an infrared signal or the like as the synchronization signal.

FIG. 3 shows the configuration of the reproduction apparatus 12 according to the present embodiment.

The reproduction apparatus 12 includes a disk drive 201, an LSI 202, a second input/output section 203, and a second remote control signal receiving section 204.

The disk drive 201 reads stream data which is record on the disk 200. The disk 200 is a storage medium, e.g., an optical disk or an HDD, on which a 3D video material is recorded. The disk 200 stores video stream data of a 3D video, for example. The 3D video is a video image, a graphics image, or a subtitle image, for example. The disk 200 may contain an audio signal.

The second remote control signal receiving section 204 receives a signal from a remote control which is manipulated by the user.

The LSI 202 receives the instruction of user manipulation which has been received by the second remote control signal receiving section 204, and merges a plurality of video stream signals (videos, graphics, subtitles, etc.) that are obtained from the disk drive 201, and outputs a video signal in which the L video and the R video are multiplexed. The second input/output section 203 outputs the video signal which is received from the LSI 202 to the display device 11 in FIG. 1. The second input/output section 203 is an HDMI terminal and a controller, for example.

As reproduction modes, the reproduction apparatus 12 has the 2D mode and the 3D mode. The 2D mode is a mode of outputting a video signal in 2D format, whereas the 3D mode is a mode of outputting a video signal in 3D format. These reproduction modes of the reproduction apparatus 12 are switched by the LSI 202. The LSI 202 is able to switch between the reproduction modes with a user manipulation, a video material identification signal, or a signal indicating whether the display device supports 3D capabilities or not, etc. The video material identification signal is a signal indicating whether the video is a 3D material that has been produced to be a 3D video or a 2D material that has been produced to be a 2D video. The video material identification signal may be contained in the stream signal, or may be recorded on the disk 200 as a separate signal from the stream signal.

In the reproduction system 100 thus constructed (FIG. 1), the reproduction apparatus 12 reads and reproduces a video stream from a storage medium, a network, etc., in accordance with a user manipulation. If it is known from the video material identification signal that the video stream is a 3D video stream, the reproduction apparatus 12 multiplexes the L video signal and the R video signal, and outputs them to the display device 11. The display device 11 causes the received L video and R video to be displayed by the display section 103 via time division. In doing so, the display device 11 transmits via infrared a synchronization signal indicating the timing of switching in the division. In accordance with the synchronization signal received from the display device 11, the stereoscopic glasses 13 alternately switches the liquid crystal shutters in terms of passing rate. Thus, the light entering the left eye and the light entering the right eye can be controlled, so that the L video is only presented to the left eye and that the R video is only presented to the right eye. By this principle, 3D stereoscopy is realized.

On the other hand, if the video stream which has been read is a 2D video stream, the reproduction apparatus 12 outputs a video signal of the 2D video stream having been read to the display device 11.

2. Configuration of the LSI 202 in the Reproduction Apparatus 12 (FIG. 4)

Figure 4:
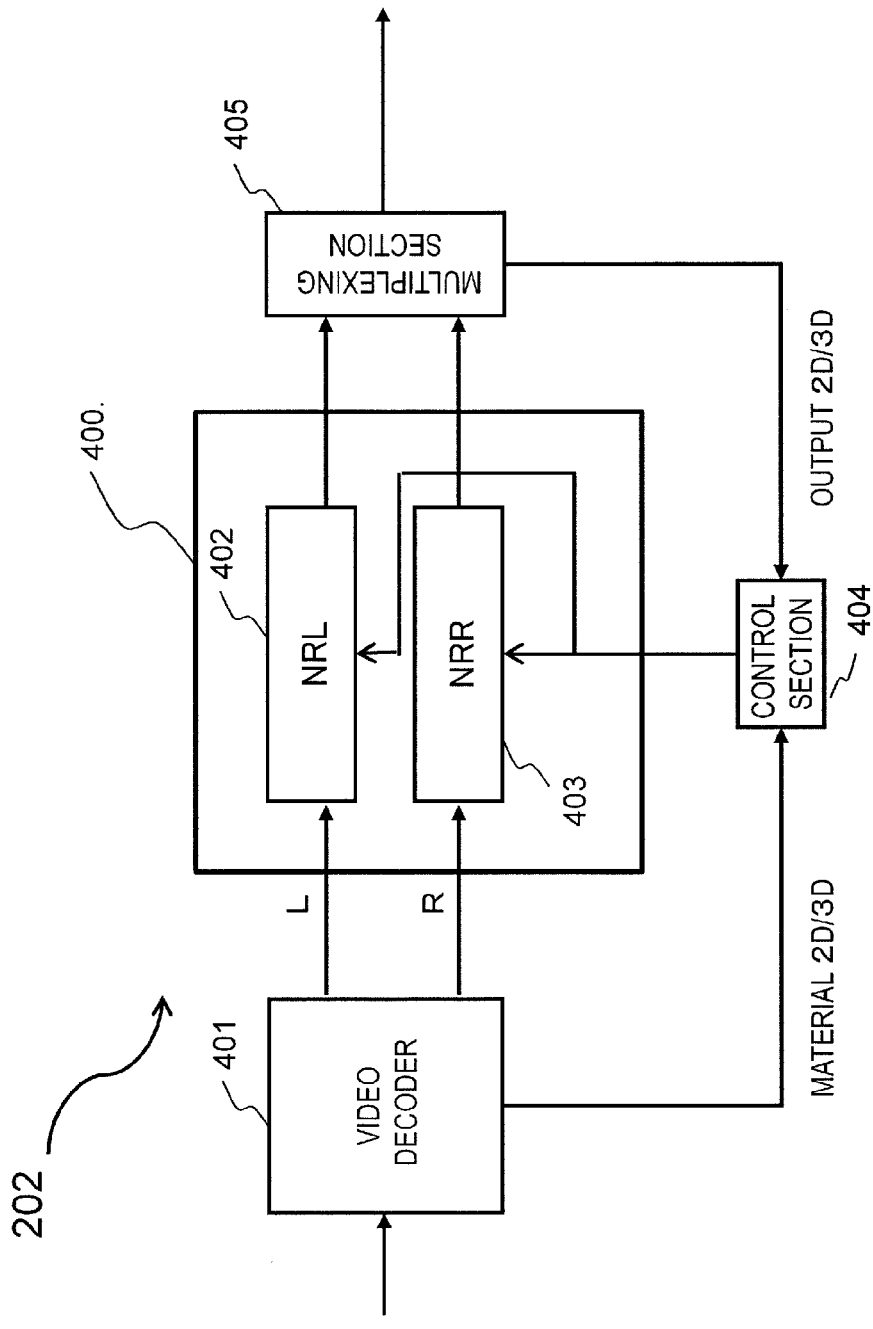
FIG. 4 is a diagram showing the configuration of an LSI 202 according to Embodiment 1.

FIG. 4 shows the configuration of the LSI 202 in the present embodiment.

The LSI 202 includes a noise processing circuit 400, a video decoder 401, a control section 404, and a multiplexing section 405. Based on a control signal given from the control section 404, the noise processing circuit 400 applies noise processing to the video signal of a video content.

In the present embodiment, the noise processing circuit 400 performs a noise reduction process. Therefore, the noise processing circuit 400 includes a noise reduction circuit (NRL) 402 for the L video signal and a noise reduction circuit (NRR) 403 for the R video signal.

The video decoder 401 receives the video stream having been read by the disk drive 201 in FIG. 3 and decodes it. In this decoding process, the aforementioned video material identification signal is referred to. When the video stream is a 3D video stream, the video decoder 401 outputs the decoded L video signal and R video signal. When the video stream is a 2D video stream, the decoded video signal is only output to the NRL 402, for example.

The NRL 402 applies a noise reduction process of reducing random noise to the L video signal, or the video signal of a 2D video stream, which is output from the video decoder 401. The NRR 403 applies a noise reduction process of reducing random noise to the R video signal which is output from the video decoder 401.

In the present embodiment, the intensity of the noise reduction process which is applied to the 2D video stream and the intensity of the noise reduction process which is applied to the 3D video stream are differentiated. More specifically, the noise reduction process which is performed by the NRL 402 and NRR 403 when processing a 3D video stream is more intense than the noise reduction process which is performed by the NRL 402 when processing a 2D video stream. The reasons thereof and the particulars of the process will be described in detail later.

The multiplexing section 405 outputs an output format identification signal to the control section 404. The output format identification signal is a signal indicating whether the output format of the video is 2D or 3D. For example, from the display device 11, the multiplexing section 405 receives via HDMI connection an instruction for 2D output or an instruction for 3D output, which the user has given to the display device 11. As a result, the multiplexing section 405 is able to output the output format identification signal to the control section 404.

When the video output format is 3D, the multiplexing section 405 multiplexes the L video signal which is output from the NRL 402 and the R video signal which is output from the NRR 403 to generate a signal in 3D format. The multiplexing section 405 outputs the generated signal in 3D format to the second input/output section 203 (FIG. 3). On the other hand, when the video output format is 2D, the multiplexing section 405 receives the video signal and/or audio signal which is output from the NRL 402, and multiplexes it to generate a signal in 2D format.

Based on the video material identification signal which is output from the video decoder 401 and the output format identification signal which is output from the multiplexing section 405, the control section 404 controls the intensities of the noise reduction processes by the NRL 402 and NRR 403.

In other words, depending on whether the video material is 2D or 3D and whether the video output format is 2D or 3D, the control section 404 controls the NRL 402 and NRR 403 so as to alter the intensities of their noise reduction processes. The particulars of the control will be described later with reference to FIG. 6.

Note that the video decoder 401 is able to identify the video material is to be 2D or 3D on the basis of the aforementioned video material identification signal.

Now, the configuration of the NRL 402 and NRR 403 will be described. In the present embodiment, it is assumed that the NRL 402 and NRR 403 are of the same configuration. The NRL 402 and NRR 403 will conveniently be referred to as the "NR circuits 402 and 403".

Figure 5:
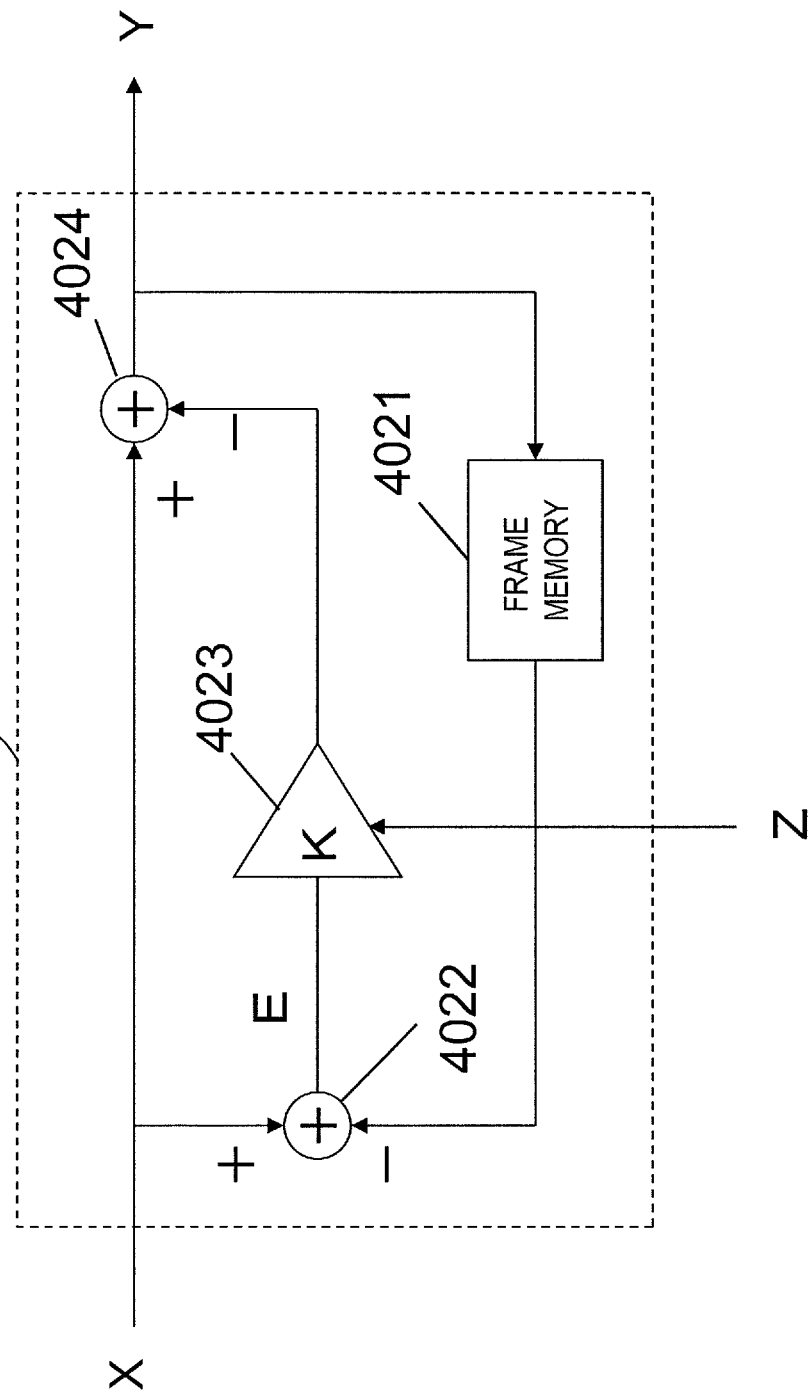
FIG. 5 is a block diagram showing the circuit configuration of NR circuits 402 and 403.

FIG. 5 is a block diagram showing the circuit configuration of the NR circuits 402 and 403.

The NR circuits 402 and 403 include a frame memory 4021, subtractor circuits 4022 and 4024, and a multiplication circuit 4023.

The frame memory 4021 is a frame memory which stores one frame's equivalent of a video output signal Y across the entire screen. The subtractor circuit 4022 subtracts the output of the frame memory 4021 from a video input signal X. The multiplication circuit 4023 multiplies the output of the subtractor circuit 4022 by a coefficient K (having a value of 0 to 1) which is adapted to the noise reduction intensity control signal Z. The subtractor circuit 4024 subtracts the output of the multiplication circuit 4023 from the video input signal X. The resultant video output signal Y is a signal (average value) which is a smoothed version of the video input signal X.

Next, the operation of the NR circuits 402 and 403 will be described.

The subtractor circuit 4022 subtracts an average value of the video output signals stored in the frame memory 4021 (a signal which is a smoothed version of the video input signal X) from the video input signal X. This output signal E can be considered as an amount of deviation from the average value of the video input signal X. As described above, since the noise associated with the silver salt particles of a film or the sensitivity of the image sensor of a camera is a randomly changing component, the random noise component that is superposed on the video signal is detectable as an amount of deviation from the average value. Therefore, the output signal E of the subtractor circuit 4022 can be regarded as a noise detection signal that represents the random noise component.

The multiplication circuit 4023 outputs a signal obtained by multiplying the noise detection signal E by the predetermined coefficient K. By subtracting the output signal of the multiplication circuit 4023 from the video input signal X, the subtractor circuit 4024 is able to remove the noise component from the video input signal X.

The coefficient K in the aforementioned multiplication circuit 4023 is a number from 0 to 1. If this value is 0, then Y=X, so that there is no noise reduction effect at all. When the coefficient K is between 0 and 1, the NR circuits 402 and 403 function to reduce changes in the video signal. Since the existence of a noise can be regarded as a change in the video signal, the intensity of reducing noise can be changed by changing the K value.

For example, Table 1 below illustrates an example where K=0.2, whereas Table 2 illustrates an example where K=0.5.

TABLE 1

|  | X | E | E · K (K = 0.2) | Y (=frame memory) |
| --- | --- | --- | --- | --- |
| t = 0 | 0 | 0 | 0 | 0 |
| t = 1 | 1 | 1 | 0.2 | 0.8 |

TABLE 1-continued

| | X | E | E·K (K = 0.2) | Y (=frame memory) |
|---|---|---|---|---|
| t = 2 | 1 | 0.2 | 0.04 | 0.96 |
| t = 3 | 1 | 0.04 | 0.008 | 0.992 |
| ... | ... | ... | ... | ... |

TABLE 2

| | X | E | E·K (K = 0.5) | Y (=frame memory) |
|---|---|---|---|---|
| t = 0 | 0 | 0 | 0 | 0 |
| t = 1 | 1 | 1 | 0.5 | 0.5 |
| t = 2 | 1 | 0.5 | 0.25 | 0.75 |
| t = 3 | 1 | 0.25 | 0.125 | 0.875 |
| ... | ... | ... | ... | ... |

According to Tables 1 and 2, the output Y changes with the value of K. Specifically, the smaller K is, the earlier the output Y approaches the input X. Moreover, the larger K is, the slower the rate at which the output Y approaches the input X is. This means that the noise component is removed more intensely when K is larger. Note that, the value of the coefficient K and the breadth of change in the coefficient K can be arbitrarily adjusted by those skilled in the art.

Thus, by controlling the value of the coefficient K based on the noise reduction intensity control signal Z, it is possible to change the intensity of the noise reduction process. Thus, as has been briefly described, the intensity of the noise reduction process which is applied to a 2D video stream and the intensity of the noise reduction process which is applied to a 3D video stream can be differentiated.

3. Operation of the LSI 202 in the Reproduction Apparatus 12 (FIG. 6)

The operation of the reproduction apparatus 12 of the present embodiment thus constructed will be described with reference to FIG. 6 and FIG. 7 below.

First, FIG. 6 is a diagram showing setup conditions for intensity of the noise reduction process (NR intensity) by the reproduction apparatus 12.

By the criteria shown in FIG. 6, the control section 404 controls the intensities of the noise reduction processes by the NRL 402 and NRR 403 based on the video material identification signal which is output from the video decoder 401 and the output format identification signal which is output from the multiplexing section 405.

Condition A represents the NR intensity in the case where a 2D video material is output intactly in 2D format.

Condition B represents the NR intensity in the case where a 2D video material is output in 3D format.

Condition C represents the NR intensity in the case where a 3D video material is output in 2D format.

Condition D represents the NR intensity in the case where a 3D video material is output intactly in 3D format.

First, under condition A, a 2D video material is output intactly in 2D format. Therefore, random-parallax noise will not occur to begin with. A standard noise reduction intensity which is suitable for usual 2D video reproduction is set.

Under condition C, the video decoder 401 converts a 3D video into a 2D video. For example, between the L video signal and R video signal which compose the 3D video, the video decoder 401 may only output the L video signal. Under condition C, too, a mere 2D video is displayed at the display device 11, so that random-parallax noise will not occur to begin with. Therefore, a standard noise reduction intensity which is suitable for 2D video reproduction is set, similarly to condition A.

Under condition D, a 3D video material is output intactly in 3D format, so that random-parallax noise may occur. Therefore, in order to reduce the random-parallax noise, a higher noise reduction intensity than that for usual 2D video reproduction (Strong 1) is set in the NRL 402 and NRR 403. As a result, the random noise amounts in the L video signal and the R video signal can be further reduced relative to those during 2D reproduction.

Under condition B, the video decoder 401 generates an L video signal and an R video signal from a 2D video, thereby converting the 2D video into a 3D video. As a result, the L video signal and the R video signal are output. Under condition B, random-parallax noise may presumably occur similarly to condition D, because the 2D video material is converted into a 3D video and then output in 3D format, and thus is displayed as a 3D video at the display device 11. In order to reduce this, a higher noise reduction intensity than that for usual 2D video reproduction (Strong 2) is set. The 3D video signal in this case, however, is presumably different from a native 3D video signal which is obtained by independently imaging an L video and an R video. In other words, assuming that an original 2D video material is used as the L video signal, and that the R video signal is generated therefrom, there will be some correlation between the L video signal and the R video signal. Although the 3D-ization creates distinct L and R signals, it should make sense that some correlation will remain particularly in the random noise signal. Therefore, it is believed that there is relatively little right-left parallax in random noise. Accordingly, the intensity of the noise reduction which is performed under condition B is set to an intermediate intensity (Strong 2) between the standard intensity for a 2D video and the intensity when outputting a 3D video material in 3D (Strong 1).

Thus, with the control section 404, by appropriately controlling the noise reduction intensity depending on whether the video material and the output format are each 2D or 3D, noises with random parallax for the right and left eyes during binocular 3D viewing can be reduced.

Note that, under condition B in FIG. 6, it depends on the method of 3D conversion as to how much correlation is shared by the random noises in the L video signal and the R video signal, and there may be cases of relatively high correlation and cases of relatively low correlation. When the correlation is high, there is also a method of applying a similar noise reduction intensity to the standard intensity during 2D video reproduction. Conversely, when the correlation is very low, there is a method of applying a similar noise reduction intensity to the intensity under condition D in FIG. 6 (Strong 1).

Moreover, in the above description, when converting a 2D video material into a 3D video material for output under condition B in FIG. 6, it is illustrated that the original 2D video material is used as the L video signal, and that the R video signal is generated therefrom. However, it would be possible to generate an L video signal and an R video signal which are distinct from the original 2D video material; in that case, too, the description presented herein will similarly apply.

Figure 7:
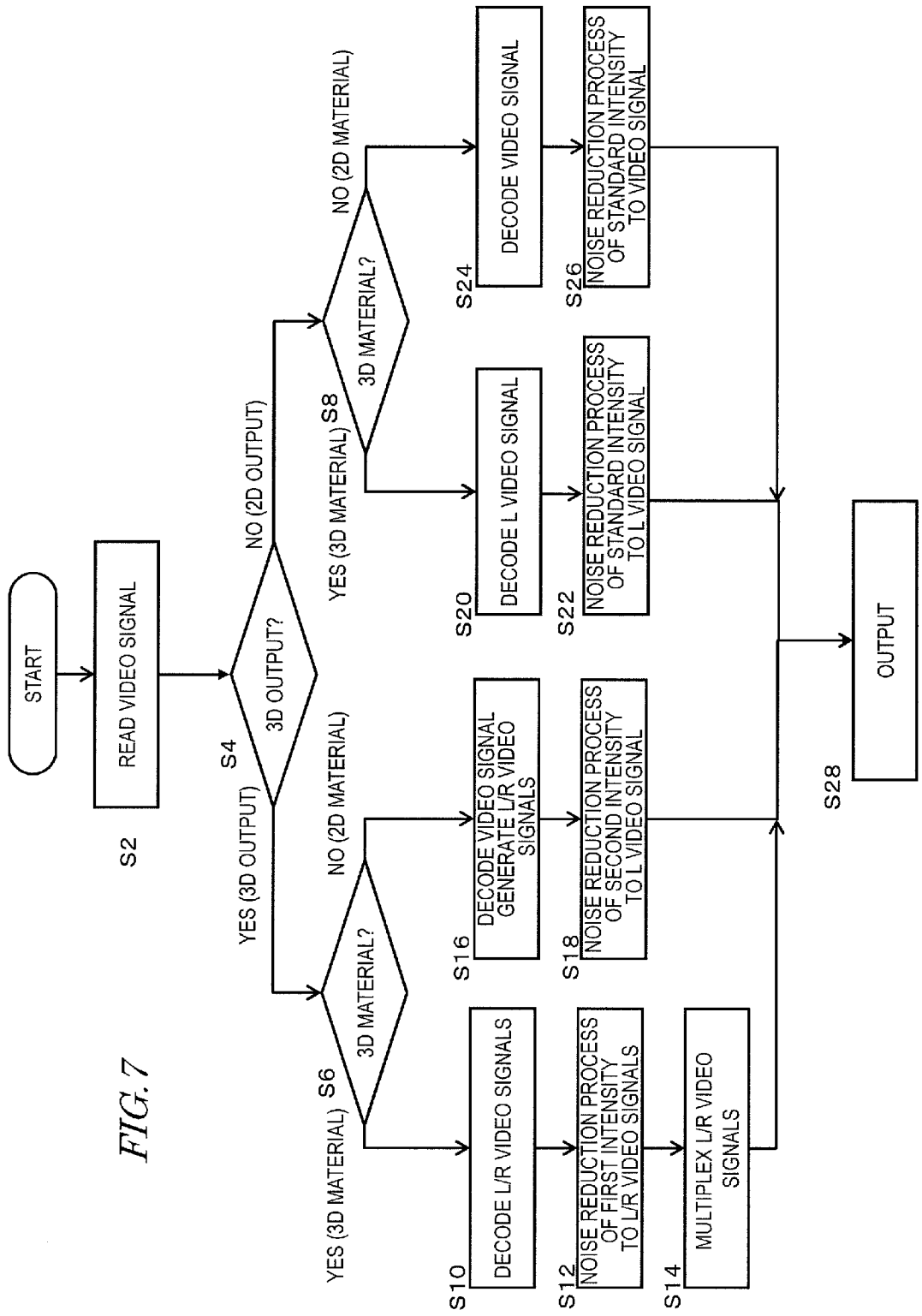
FIG. 7 is a flowchart showing a procedure of processing by the reproduction apparatus 12 according to Embodiment 1.

FIG. 7 is a flowchart showing a procedure processing by the reproduction apparatus 12 of the present embodiment.

At step S2, the disk drive 21 reads a stream signal which is recorded on the disk 200. At the next step S4, based on the output format identification signal received from the multiplexing section 405, the control section 404 determines whether the video output is 2D or 3D. If the video output is 3D, the process proceeds to step S6; if it is 2D, the process proceeds to step S8.

At step S6, based on the video material identification signal received from the video decoder 401 the control section 404 further determines whether the video signal is a 3D material or a 2D material. If the video signal is a 3D material, the process proceeds to step S10; if it is a 2D material, the process proceeds to step S16.

At step S6 above, the determination as to whether the video material is 2D or 3D is basically made based on whether there exist two video signals or not, i.e., the L video signal and the R video signal. As for the format of the two video signals, there may be two independent compressed video streams; or, within one compressed video stream, the L video and the R video may be recorded via an upper-lower or right-left split of the screen (which are respectively called the top-and-bottom method and the side-by-side method). Furthermore, in the case of the top-and-bottom method or the side-by-side method, no distinction from the usual 2D video may be available on the system (i.e., there is no identification flag). In such a case, the user may be allowed to switch between the 2D reproduction mode and the 3D reproduction mode. In any of these cases, a noise reduction process may be performed under the above-described setup conditions.

Step S8 also makes an entirely identical determination to step S6. If the video signal is a 3D material, the process proceeds to step S20; if it is a 2D material, the process proceeds to step S24.

Next, the processes from steps S10 to S14 will be described.

Steps S10 to S14 are processes of outputting a video signal of a 3D material in 3D (condition D in FIG. 6). At step S10, the video decoder 401 decodes L and R video signals. Then, at step S12, the NRL 402 and NRR 403 in the noise processing circuit 400 respectively apply a noise reduction process to the decoded L and R video signals. The intensity of this noise reduction process is the highest, as shown in FIG. 6. At step S14, the multiplexing section 405 generates a video signal in which the L and R video signals that are output from the NRL 402 and NRR 403 are multiplexed. Thereafter, at step S28, the second input/output section 203 outputs the multiplexed video signal.

Steps S16 and S18 are processes of outputting a 2D material in 3D (condition B in FIG. 6). At step S16, the video decoder 401 decodes the video signal, and generates L and R video signals from the resultant signal. For example, the video decoder 401 uses the original 2D video material as the L video signal, and generates the R video signal therefrom. Then at step S18, the NRL 402 and NRR 403 in the noise processing circuit 400 respectively apply a noise reduction process to the decoded L and R video signals. The intensity of the noise reduction process is a second intensity which is intermediate between the first intensity and the standard intensity, as shown in FIG. 6. Thereafter, at step S28, the second input/output section 203 outputs a multiplexed video signal.

Next, the processes of steps S20 and S22 will be described.

Steps S20 and S22 are processes of outputting a 3D material in 2D (condition C in FIG. 6). At step S20, between the L video signal and the R video signal composing the 3D video, the video decoder 401 only outputs the L video signal. Then, at step S22, the NRL 402 in the noise processing circuit 400 applies a noise reduction process to the decoded L video signal. The intensity of the noise reduction process is the standard intensity, as shown in FIG. 6. Thereafter at step S28, the second input/output section 203 outputs a video signal.

Steps S24 and S26 are processes of outputting a 2D material in 2D (condition A in FIG. 6). At step S24, the video decoder 401 decodes a 2D video signal for output. Then at step S26, the NRL 402 in the noise processing circuit 400 applies a noise reduction process to the decoded video signal, for example. The intensity of the noise reduction process is the standard intensity, as shown in FIG. 6. Thereafter at step S28, the second input/output section 203 outputs a video signal.

Thus, the reproduction apparatus 12 according to Embodiment 1 has been described.

The present embodiment has been described with respect to an exemplary case where a video material identification signal is recorded on the disk. However, there may be disks which do not contain a video material identification signal. In such cases, the reproduction apparatus 12 may analyze a video signal obtained by decoding a stream signal to identify whether the video signal is a 3D material or a 2D material. For example, in order to identify a 3D material of the side-by-side method, a video frame of (lateral: 2M pixels, vertical: N pixels) may be split in right-left fashion to obtain two images of (lateral: M pixels, vertical: N pixels), and if the two images can be regarded as similar, that video frame may be identified as a 3D material. Alternatively, in order to identify a 3D material of the top-and-bottom method, a video frame of (lateral: P pixels, vertical: 2Q pixels) may be split in top-bottom fashion to obtain two images of (lateral: P pixels, vertical: Q pixels), and if the two images can be regarded as similar, that video frame may be identified as a 3D material. The determination as to whether two images can be regarded as similar may be made by, for example, numerically expressing a characteristic amount (color distribution, luminance gradient pattern, etc.) of the two images, and checking whether the numeric expressions exist within a predefined range.

Also possible is a case where the video signal is never analyzed. For example, the ARIB of Japan defines a flag which indicates whether a given video signal is a 3D video of the side-by-side method or not. By checking this flag, it is possible to identify whether the video signal is a 3D material or a 2D material.

(Embodiment 2)

Embodiment 1 above illustrates a video reproduction apparatus which reduces random-parallax noise through a noise reduction process.

Now, radically reducing the random-parallax noise through a noise reduction process may possibly lead to a new problem.

Particularly in the case of a movie material or the like, the random noise associated with silver salt particles that occurs in film shooting is called "film grain", which may occasionally be regarded as a favorable noise that represents a film-derived texture in works of movies.

In such cases, when random-parallax noise is removed by the method described in Embodiment 1, the film-derived texture may be lost, thereby detracting from the texture of the work to the contrary. Therefore, some viewers may desire that the film grain be left.

Therefore, the present embodiment will describe a reproduction apparatus which, while reducing noises with random parallax, allows some film-derived texture to be left when reproducing a binocular 3D video.

1. Configuration (FIGS. 1, 2, 3)

The configuration of the reproduction apparatus of the present embodiment is identical to the configuration of FIGS.

1 to 3 which has been described in connection with Embodiment 1. Therefore, descriptions of such configuration will be omitted in the present embodiment. The present embodiment differs from Embodiment 1 with respect to the configuration of the LSI 202 shown in FIG. 3. Hereinafter, the configuration of the LSI 202 will be described.

2. Configuration of the LSI 202 in the Reproduction Apparatus (FIG. 8)

Figure 8:
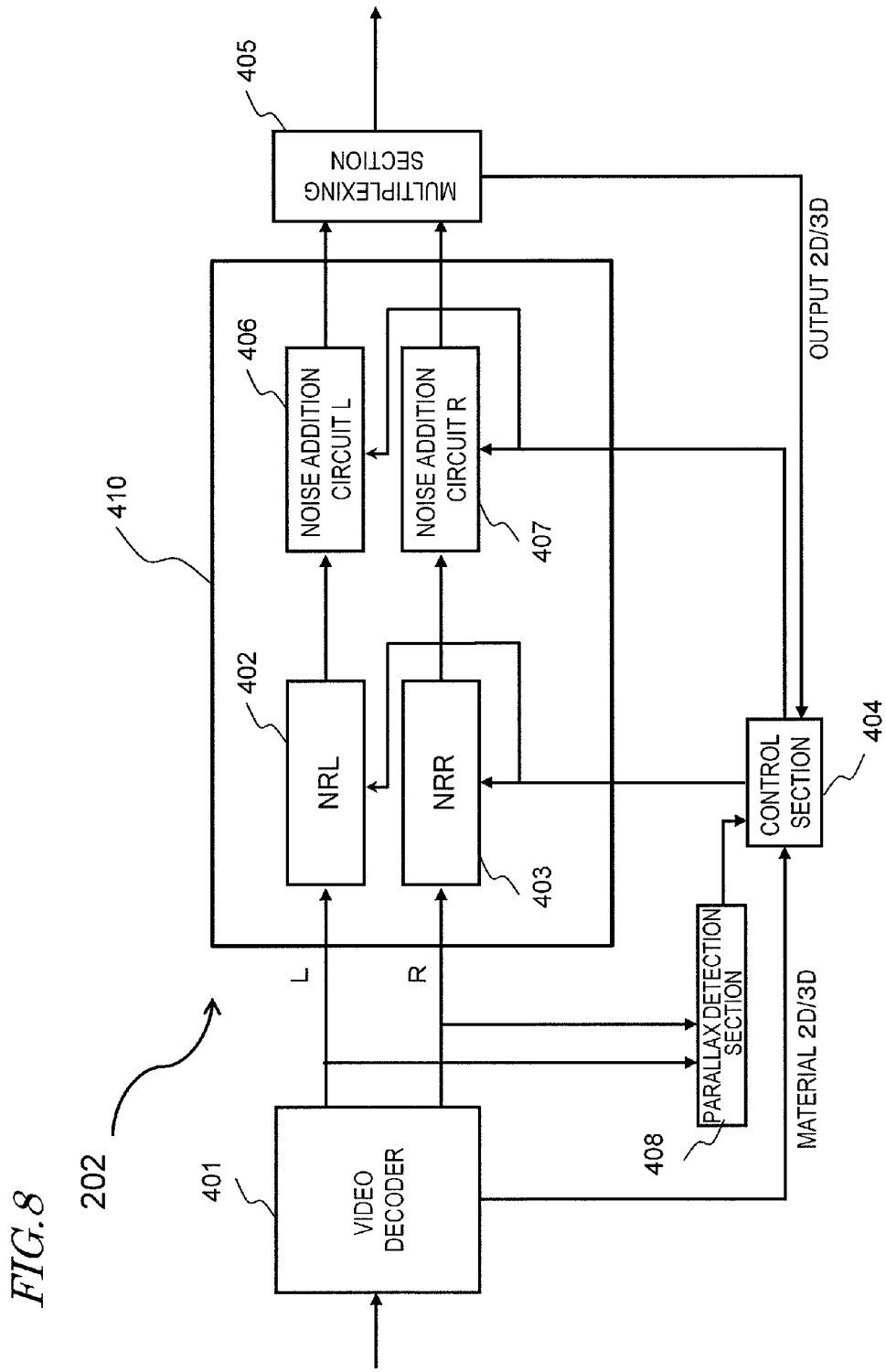
FIG. 8 is a diagram showing the configuration of an LSI 202 according to Embodiment 2.

FIG. 8 shows the configuration of the LSI 202 according to the present embodiment.

The LSI 202 according to the present embodiment includes a noise processing circuit 410, a video decoder 401, a control section 404, a multiplexing section 405, and a parallax detection section 408. In FIG. 8, the video decoder 401, the NRL 402, the NRR 403, and the multiplexing section 405 are similar to those in FIG. 4 described in Embodiment 1, and the descriptions thereof will be omitted. Hereinafter, the noise processing circuit 410 and the parallax detection section 408 will be described.

Based on a control signal given from the control section 404, the noise processing circuit 410 applies noise processing to the video signal of a video content.

In the present embodiment, the noise processing circuit 410 not only performs a noise reduction process similar to that in Embodiment 1, but also performs a process of intentionally adding noise to a 3D video signal which has been subjected to noise reduction. This noise functions as pseudo film grain. In order to perform such a noise addition process, the noise processing circuit 400 includes a noise addition circuit L406 and a noise addition circuit R407, in addition to the NRL 402 and NRR 403.

In accordance with an output signal from the control section 404, the noise addition circuit L406 and the noise addition circuit R407 add random noise to video signals which are output from the NRL 402 and the NRR 403, respectively, and output them to the multiplexing section 405.

Based on the L video signal and the R video signal which are output from the video decoder 401, the parallax detection section 408 detects a parallax amount. Specifically, in each of the L video and the R video, the parallax detection section 408 sets a plurality of regions of the same size. Then, for each region, the parallax detection section 408 detects an amount of positional deviation of a subject existing in that region. The amount of positional deviation is identified as a number of pixels. As a result, the parallax detection section 408 is able to determine the parallax amount in that region. The entire information encompassing the parallax amounts in different regions is called a depth map. The parallax detection section 408 takes an average of the parallax amounts of all regions described in the depth map to determine a parallax amount of the overall video frame.

Based on a video material identification signal which is output from the video decoder 401, an output format identification signal which is output from the multiplexing section 405, and the detected parallax amount which is output from the parallax detection section 408, the control section 404 controls the intensities of the noise reduction by the NRL 402 and the NRR 403, and the amounts of random noise to be added in the noise addition circuit L406 and the noise addition circuit R407.

As the principle of parallax amount detection by the parallax detection section 408, conventionally known techniques can be used. For example, the parallax detection section 408 can detect the parallax amount between the L video signal and the R video signal via vector detection.

Figure 9:
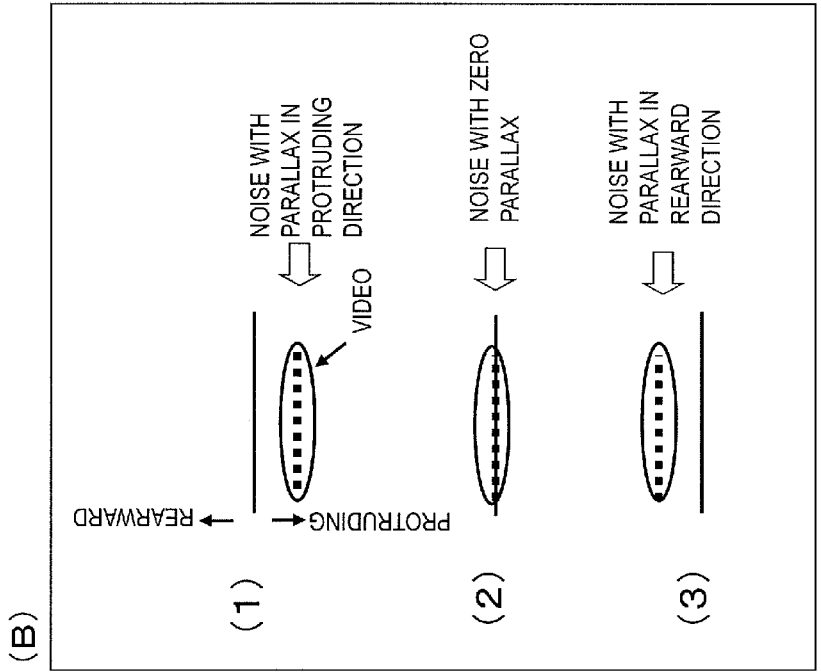
FIGS. 9(A) and 9(B) are diagrams showing different methods of adding pseudo noises.
Figure 9:
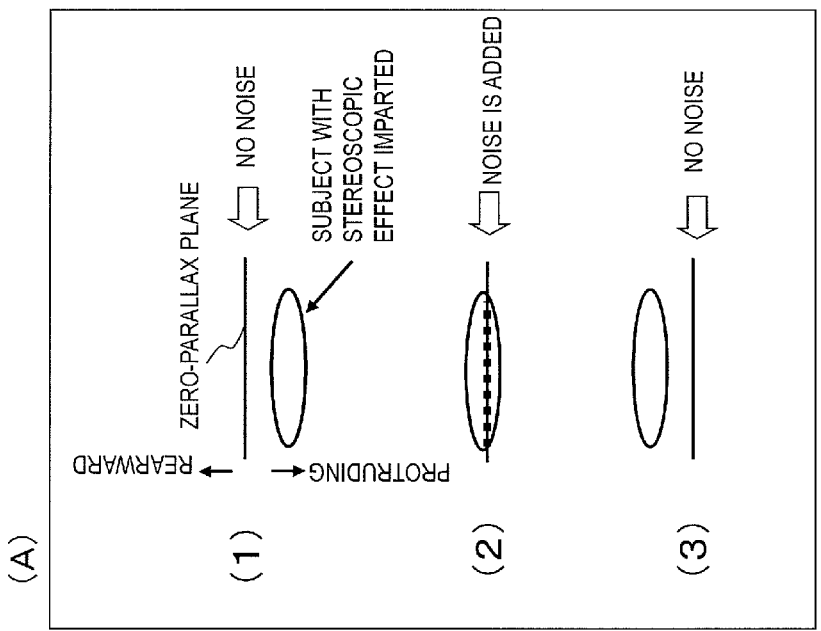

3. Operation of the LSI 202 in the Reproduction Apparatus 12 (FIG. 9)

The operation of the reproduction apparatus 12 of the present embodiment thus constructed will be described with reference to FIG. 9 below.

Note that the principle by which the control section 404 controls the intensities of the noise reduction processes by the NRL 402 and NRR 403 based on the video material identification signal which is output from the video decoder 401 and the output format identification signal which is output from the multiplexing section 405 is similar to that in Embodiment 1. Therefore, its description will not be repeated. Through this process, the random noise in the 3D video can be reduced.

Next, the noise addition circuit L406 and the noise addition circuit R407 add noise to the 3D video. In doing so, the following point needs attention. That is, if pseudo noises are indiscriminately applied to the entire 3D video, it may be possible for a displayed position in the 3D video in the rearward or protruding direction to disagree with the displayed position of the pseudo noises. This will not provide an effect of enhancing the texture of the 3D video, but will result in merely adding the noise. For example, even when a subject appears protruding by 3D visual effect, the pseudo noises being displayed at a position near a rearward position which is set at zero parallax will not allow themselves to be recognized as the film grain of the 3D video, but become mere noise.

With reference to FIG. 9, the operation of the control section 404 will be specifically described. FIGS. 9(A) and (B) show different methods of adding pseudo noises.

FIGS. 9(A) and (B) show a relationship between a plane which is set at zero parallax and directions in which stereoscopic effects of the 3D video may be provided. It is assumed that the plane which is set at zero parallax corresponds to the position of an actual display plane on which a 2D video is displayed. For example, (1) in FIG. 9(A) schematically shows how a subject may appear protruding frontward, when assuming that the plane which is set at zero parallax is the actual display plane. The lower direction in the figure represents a direction in which a subject may appear protruding toward the viewer, whereas the upper direction in the figure represents a rearward direction in which a subject may appear receded.

In FIG. 9(A), (1) to (3) show specific examples of methods of varying the pseudo noise amount in accordance with the size of parallax amount which the 3D video has. On the other hand, FIG. 9(B) shows a specific example of the method of varying the displayed position of pseudo noises depending on the displayed position in the rearward or protruding direction which is determined by a parallax amount (average value across the entire screen) which the 3D video has.

The example of FIG. 9(A) will be described. When the displayed position in the 3D video is close to the zero-parallax plane (i.e., the average value of parallax amounts across the entire screen is close to 0), the control section 404 increases the added amount of pseudo noises. In FIG. 9(A), the stereoscopic effect applied to the subject is smaller in the example of (2) than in the example of (1) or (3). In other words, the displayed position of the subject is close to the zero-parallax plane. Therefore, in the example of (2), greater pseudo noises are added than in the example of (1) or (3).

Note that the examples of (1) and (3) of FIG. 9(A) are illustrated as having no pseudo noises added.

By doing this, in the case where the displayed position in the 3D video is far from the zero-parallax plane, relatively small pseudo noises are added to the video, so that oddness due to pseudo noises can be reduced. On the other hand, if the displayed position in the 3D video is close to the zero-parallax plane, relatively large pseudo noises are added to the video, thereby imparting pseudo film grain to the video.

The example of FIG. 9(B) will be described. When a given subject in the 3D video is positioned in the protruding direction from the zero-parallax plane, the control section 404 adds pseudo noises in such a manner that the pseudo noises are also displayed in the protruding direction ((1) in FIG. 9(B)).

Moreover, when the displayed position in the 3D video is close to the zero-parallax plane, the control section 404 adds pseudo noises in such a manner that the pseudo noises are also displayed close to the zero-parallax plane ((2) in FIG. 9(B)). Furthermore, when the displayed position in the 3D video is positioned in the rearward direction from the zero-parallax plane, the control section 404 adds pseudo noises in such a manner that the pseudo noises are also displayed in the rearward direction ((3) in FIG. 9(B)).

The aforementioned depth map can be utilized in the above process. For instance, this will be illustrated in the example of (1) in FIG. 9(B). Assuming that the control section 404 has detected, based on the depth map, that a parallax amount in the protruding direction is imparted to a given region, the control section 404 will then add pseudo noises having a parallax that corresponds to that amount of protrusion.

The noises are respectively added to the L video and the R video of the 3D video. At this time, the noise addition circuit L406 may first generate noise for the L video signal, and the noise addition circuit R407 may generate noise for the R video signal by imparting to that noise an offset of the same size as the detected parallax amount, for example.

Note that the parallax to be imparted to the noise may be made smaller than the interspaces in the grain, for example, because in that manner the added noise is prevented from being perceived as random-parallax noise.

In the above-described example, the parallax amount which is possessed by a 3D video is determined based on an average value across the entirety of one video frame. However, this is only an example. An average value across a partial region, rather than the entirety of one video frame, may be used for parallax detection.

Moreover, the noise addition circuit R406 and the noise addition circuit L407 may decide not to add noise to any region to which a parallax in the rearward direction or the protruding direction is clearly imparted.

The noise addition process according to the present embodiment may be introduced between steps S12 and S14 between steps S18 and S28, between steps S22 and S28, and between steps S26 and S28 in FIG. 7. Alternatively, the noise addition process according to the present embodiment may be introduced only between steps S12 and S14 and between steps S18 and S28 in FIG. 7, where a noise reduction process which is more intense than the standard one is performed.

Thus, embodiments of the reproduction apparatus have been described.

The configurations of the above embodiments are only exemplary, and may be altered as necessary.

Embodiments 1 and 2 are illustrated as reproduction apparatuses of a generic 3D video. However, these may take place in a step of creating a 3D video material (an authoring step of a package media such as an optical disk, a content creating step for broadcasting or network distribution, etc.).

Embodiments 1 and 2 have illustrated reproduction apparatuses capable of reproducing a stereoscopic video. However, the above-described function of a reproduction apparatus may be provided in an image sensor, for example.

Although the display device 11 and the reproduction apparatus 12 are illustrated as independent component elements in FIG. 1, these may be integrated into a single housing, so as to realize a single device. In other words, they may become a display device having a built-in function of a reproduction apparatus. This may be realized as a television set with an internal optical disk player, for example. In this case, the display device qualifies as the aforementioned reproduction apparatus 12.

Moreover, in the case where the display device 11 shown in FIG. 1 is capable of reproducing a broadcast signal of a 3D video, the display device 11 may be allowed to have the aforementioned LSI 202 of the reproduction apparatus 12 (FIG. 3) or its function. In this case, too, the display device qualifies as the aforementioned reproduction apparatus 12.

Moreover, a video recording apparatus generally functions also as a video reproduction apparatus. For example, an optical disk recorder would also function as an optical disk player. Therefore, a video recording apparatus qualifies as the aforementioned reproduction apparatus 12.

In the above embodiments, the NRL 402 and NRR 403 have been illustrated as two independent circuits. However, it suffices if there is at least one noise reduction circuit. Even with one noise reduction circuit, a noise reduction process for the R video and L video can be realized through accelerated processing, parallel configuration, etc., within the bounds of delay requirements at reproduction.

The same is also true of the noise addition circuit 406 and 407 in Embodiment 2. These do not need to be two independent circuits; there may be at least one of them.

In the above embodiments, the NRL 402 and NRR 403 are illustrated as applying the same noise reduction process to the L video and the R video. However, different noise reduction processes may be applied to the L video and the R video. However, they are preferably not too different because, if they were significantly different, the differences in the videos presented to the right and left eyes would be perceived, thereby leading to oddness. For example, assuming that noise reduction intensity control signal Z undergoes N steps of change, a range of 10% to 20% thereof may be acceptable.

The same is also true of the noise addition circuit 406 and 407 in Embodiment 2. Different noise addition processes may be applied to the L video and the R video.

As for the video signal to be contained in a stream signal(s), the L video signal and the R video signal may be multiply recorded as a single stream, or recorded as separate streams.

Although Embodiments 1 and 2 illustrate that the L video and the R video are displayed via time division on a display and are viewed with glasses having liquid crystal shutters which are in synchronization therewith, such a configuration is not a limitation. A number of methods have been proposed, e.g., a method of split-displaying into spatial directions with polarizing filters attached on the display surface or the like; broad applications would be possible with so-called binocular 3D reproduction apparatuses. For example, a device having two display panels such that the L video and the R video are displayed by the respective display panels (e.g., a head-mount display) may also serve as a binocular 3D reproduction apparatus. In other words, any method of 3D displaying which utilizes parallax between the left eye and the right eye is encompassed by the present invention.

Embodiments 1 and 2 have been illustrated with respect to an example where a 3D video is recorded on the disk 200. However, the recording medium is not limited to a disk medium, but may be, for example, a storage medium (e.g., a hard disk or an SSD (Solid State Drive)) provided in the reproduction apparatus 12, or a storage medium that is removable from the reproduction apparatus 12 (e.g., an SD card or a USB memory). The 3D video may also be downloaded via a network.

The above embodiments both illustrate reproduction apparatuses as examples. However, the present invention is also implementable as a computer program which causes such a reproduction apparatus to operate. For example, the LSI 202 in the reproduction apparatuses 12 according to Embodiments 1 and 2 above can be implemented in hardware, as a computer program incorporated in semiconductor circuitry, e.g., a DSP. As for Embodiment 1, for example, such a computer program would include instructions for executing the procedure that is shown by the flowchart of FIG. 7. The computer program is distributed on the market in the form of a product recorded on a storage medium such as a CD-ROM, or transmitted via telecommunication lines such as the Internet.

INDUSTRIAL APPLICABILITY

The present invention is applicable to reproduction apparatuses or the like which are capable of reproducing a stereoscopic video, e.g., players.

REFERENCE SIGNS LIST 11 display device
12 reproduction apparatus
13 stereoscopic glasses
101 first input/output section
102 LSI
103 display section
104 first remote control signal receiving section
105 transmission section
200 disk
201 disk drive
202 LSI
203 second input/output section
204 second remote control signal receiving section
401 video decoder
402 NRL
403 NRR
404 control section
405 multiplexing section
406 noise addition circuit L
407 noise addition circuit R
408 parallax detection section

The invention claimed is:

1. A reproduction apparatus comprising:
a noise processing circuit configured to apply noise processing to a video signal of a video content based on a given control signal; and
a control circuit configured to receive an output format identification signal which identifies an output format of the video content, and generating the control signal in accordance with the output format identification signal, the control circuit generating a control signal which causes the noise processing performed in the noise processing circuit to vary depending on whether an output format of the video content is a two-dimensional video or a three-dimensional video, wherein,
the noise processing circuit includes at least one noise reduction circuit configured to apply a noise reduction process to the video signal based on the control signal;
the noise reduction process applied to the video content by the at least one noise reduction circuit based on the control signal when the output format of the video content is a three-dimensional video is more intense than the noise reduction process applied to the video content when the output format of the video content is a two-dimensional video; and
the at least one noise reduction circuit
generates a noise detection signal representing a noise component by calculating a difference between the video signal before being subjected to the noise reduction process and the video signal after being subjected to the noise reduction process, and
performs the noise reduction process by subtracting a signal obtained by multiplying the noise detection signal by a coefficient which is determined in accordance with the control signal from the video signal before being subjected to the noise reduction process.

2. The reproduction apparatus of claim 1, wherein, the control circuit further receives a video material identification signal indicating whether the video content has been produced to be a three-dimensional video or produced to be a two-dimensional video; and
when the output format of the video content is a three-dimensional video,
the noise reduction process applied to the video content which has been produced to be a three-dimensional video is more intense than the noise reduction process applied to the video content which has been produced to be a two-dimensional video.

3. The reproduction apparatus of claim 1, wherein, when the output format of the video content is a three-dimensional video, the at least one noise reduction circuit performs a more intense noise reduction process by setting as the coefficient a value which is greater than that when the output format of the video content is a two-dimensional video.

4. The reproduction apparatus of claim 1, further comprising a decoder configured to decode a video signal of a three-dimensional video into a video signal of a left-eye video and a video signal of a right-eye video, wherein
the noise processing circuit includes two noise reduction circuits, one noise reduction circuit being configured to apply a noise reduction process to the video signal of the left-eye video based on the control signal, the other noise reduction circuit being configured to apply a noise reduction process to the video signal of the right-eye video based on the control signal.

5. The reproduction apparatus of claim 4, further comprising a multiplexing circuit configured to multiplex for output the respective video signals of the left-eye video and the right-eye video having been subjected to the noise reduction processes by the two noise reduction circuits.

6. The reproduction apparatus of claim 5, wherein the multiplexing circuit receives the output format identification signal from an external device, and outputs the output format identification signal to the control circuit.

7. The reproduction apparatus of claim 1, further comprising a detection circuit configured to detect, when the video content is composed of a left-eye video and a right-eye video, parallax information concerning a parallax between the left-eye video and the right-eye video, wherein
the noise processing circuit includes at least one noise addition circuit configured to add noise to the video signal based on the parallax information.

8. The reproduction apparatus of claim 7, wherein the at least one noise addition circuit adds more noise to the video signal as the parallax becomes smaller.

9. The reproduction apparatus of claim 7, wherein,
the parallax information contains information indicating which position in a rearward direction or a protruding direction a subject contained in the video content is located at; and
the at least one noise addition circuit adds the noise so as to be displayed at a position in the rearward direction or protruding direction corresponding to the parallax information.

10. A reproduction method comprising:
receiving an output format identification signal which identifies an output format of a video content;
determining whether the output format of the video content is a two-dimensional video or a three-dimensional video in accordance with the output format identification signal; and
applying a noise reduction process to a video signal of the video content based on a result of determination, such that the noise reduction process applied to the video content when the output format of the video content is a three-dimensional video is made more intense than the noise reduction process applied to the video content when the output format of the video content is a two-dimensional video, wherein,
applying the noise reduction process includes:
generating a noise detection signal representing a noise component by calculating a difference between the video signal before being subjected to the noise reduction process and the video signal after being subjected to the noise reduction process; and
subtracting a signal obtained by multiplying the noise detection signal by a coefficient which is determined in accordance with a control signal from the video signal before being subjected to the noise reduction process, the control signal being in accordance with the output format identification signal.

11. A computer program stored on a non-transitory computer-readable storage medium, and to be executed by a computer mounted in a reproduction apparatus, wherein
the computer program causes the computer in the reproduction apparatus to execute:
receiving an output format identification signal which identifies an output format of a video content;
determining whether the output format of the video content is a two-dimensional video or a three-dimensional video in accordance with the output format identification signal; and
applying a noise reduction process to a video signal of the video content based on a result of determination, such that the noise reduction process applied to the video content when the output format of the video content is a three-dimensional video is made more intense than the noise reduction process applied to the video content when the output format of the video content is a two-dimensional video, wherein,
applying the noise reduction process includes:
generating a noise detection signal representing a noise component by calculating a difference between the video signal before being subjected to the noise reduction process and the video signal after being subjected to the noise reduction process; and
subtracting a signal obtained by multiplying the noise detection signal by a coefficient which is determined in accordance with a control signal from the video signal before being subjected to the noise reduction process, the control signal being in accordance with the output format identification signal.

* * * * *